(12) United States Patent
Freienstein et al.

(10) Patent No.: US 10,354,181 B2
(45) Date of Patent: Jul. 16, 2019

(54) IDENTIFICATION MODULE

(71) Applicant: Robert Bosch GmbH, Stuttgart (DE)

(72) Inventors: Heiko Freienstein, Weil der Stadt (DE); Benjamin Visel, Bad Liebenzell-Moettlingen (DE); Christoph Steurer, Urbach (DE); Joerg Moennich, Stuttgart (DE); Tobias Herr, Stuttgart (DE); Anja Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/739,008

(22) PCT Filed: May 12, 2016

(86) PCT No.: PCT/EP2016/060672
§ 371 (c)(1),
(2) Date: Apr. 13, 2018

(87) PCT Pub. No.: WO2016/206859
PCT Pub. Date: Dec. 29, 2016

(65) Prior Publication Data
US 2018/0357523 A1    Dec. 13, 2018

(30) Foreign Application Priority Data
Jun. 24, 2015  (DE) .......... 10 2015 211 686

(51) Int. Cl.
*G06K 19/06* (2006.01)
*G06K 19/077* (2006.01)
(Continued)

(52) U.S. Cl.
CPC .......... *G06K 19/07758* (2013.01); *B25F 5/00* (2013.01); *B25F 5/02* (2013.01);
(Continued)

(58) Field of Classification Search
CPC .... G06K 19/00; G06K 19/07; G06K 17/0022; G06K 17/0025; G06K 17/0029
(Continued)

(56) References Cited

U.S. PATENT DOCUMENTS

| | | | | |
|---|---|---|---|---|
| 5,380,994 A | * | 1/1995 | Ray | G06F 1/163 235/375 |
| 5,668,803 A | * | 9/1997 | Tymes | G06K 7/0008 370/312 |
| 5,835,377 A | * | 11/1998 | Bush | G01S 5/0027 700/99 |
| 2005/0197093 A1 | | 9/2005 | Wiklof et al. | |
| 2008/0238609 A1 | | 10/2008 | Wiesner et al. | |
| 2013/0267247 A1 | | 10/2013 | Wible et al. | |

FOREIGN PATENT DOCUMENTS

| | | |
|---|---|---|
| DE | 102 38 710 A1 | 3/2004 |
| DE | 20 2004 020 457 U1 | 7/2005 |

(Continued)

OTHER PUBLICATIONS

International Search Report corresponding to PCT Application No. PCT/EP2016/060672, dated Jul. 27, 2016 (German and English language document) (7 pages).

*Primary Examiner* — Daniel St Cyr
(74) *Attorney, Agent, or Firm* — Maginot, Moore & Beck LLP

(57) ABSTRACT

An identification module for mobile objects, in particular hand-held power tools, includes a housing, a transponder, and a stored energy source. The housing has a mechanism configured to arrange and/or fasten the identification module to a mobile device. The transponder has a data memory and a radio module. The memory is configured to store identification data, and the radio module is configured to send the identification data. The stored energy source is configured to power the transponder. The housing has a chamber, an opening into the chamber, and a lid configured to close the (Continued)

opening. The opening is configured so as to enable the stored energy source to be removably arranged in the chamber via the opening.

11 Claims, 4 Drawing Sheets

(51) Int. Cl.
  *B25F 5/00*   (2006.01)
  *G06K 19/07*  (2006.01)
  *B25F 5/02*   (2006.01)
  *H04B 1/02*   (2006.01)
  *H04R 25/00*  (2006.01)

(52) U.S. Cl.
  CPC .............. *G06K 19/07* (2013.01); *H04B 1/02* (2013.01); *H04R 25/602* (2013.01)

(58) Field of Classification Search
  USPC .............................. 235/492, 462.46, 472.02
  See application file for complete search history.

(56) References Cited

FOREIGN PATENT DOCUMENTS

| | | |
|---|---|---|
| DE | 20 2005 010 622 U1 | 12/2006 |
| DE | 10 2005 053 821 A1 | 5/2007 |
| DE | 603 14 423 T2 | 2/2008 |
| DE | 10 2006 046 801 A1 | 4/2008 |
| DE | 11 2005 003 511 T5 | 4/2008 |
| DE | 20 2008 012 687 U1 | 1/2009 |
| DE | 10 2008 005 795 A1 | 7/2009 |
| DE | 10 2011 050 393 A1 | 11/2012 |
| DE | 10 2011 089 499 A1 | 6/2013 |
| DE | 20 2014 006 084 U1 | 9/2014 |

* cited by examiner

IDENTIFICATION MODULE

This application is a 35 U.S.C. § 371 National Stage Application of PCT/EP2016/060672, filed on May 12, 2016, which claims the benefit of priority to Serial No. DE 10 2015 211 686.7, filed on Jun. 24, 2015 in Germany, the disclosures of which are incorporated herein by reference in their entirety.

The disclosure relates to an identification module for mobile devices, in particular hand-held power tools, having a housing, which has means for arranging/fastening the identification module on/to a mobile device, having a transponder, which has a data storage for storing identification data, and has a radio module for wirelessly transmitting this identification data, and having an energy storage device for electrical supply to the transponder.

BACKGROUND

Identification modules of the type stated at the outset are known from the prior art. In the trades sector, for the purpose of inventorying mobile items, in particular mobile devices such as, for example, electrically operated hand-held power tools, or also accessories such as, for example, electric leads, cable drums, tools or the like, is effected predominantly by manual identification marking in the form of an inventory number or serial number. Frequently, the inventory is documented in handwriting on paper, or by means of software. Frequently in this case, further attributes such as, for example current storage location, place of use, assigned employee, test cycles, usage time or the like are also assigned to each item.

In order to facilitate inventorying, it is also already known to provide the mobile items with a respective identification module, which can be adhesive-bonded to the respective item. The identification module has a transponder for wireless communication, and a storage, in which identification data can be retrievably stored, and an energy storage device that supplies the transponder with electrical energy.

SUMMARY

The identification module according to the disclosure has the advantage that the identification module has a particularly long service life, and in particular can be used beyond the service life of the energy storage device. The result achieved is that there is no need to replace the entire identification module when the electrical capacity of the energy storage device is exhausted. This is achieved according to the disclosure in that the housing has an opening to a chamber, and has a cover, wherein the opening can be closed by the cover, and the energy storage device is arranged in the chamber so as to be removable through the opening. The disclosure thus provides that the energy storage device of the identification module is replaceable. For this purpose, the opening can be closed by the cover, and can be uncovered if required, by removal of the cover, such that a user can remove the energy storage device from the housing, through the opening, and replace it by a charged energy storage device. When the cover closes the opening, the energy storage device is securely stored in the chamber. When the cover is removed, the energy storage device can easily be replaced. There is therefore no need to replace the entire identification module when the capacity of the energy storage device is exhausted.

According to a preferred development of the disclosure, it is provided that the cover is detachably held on the housing, closing the opening, by a bayonet joint. The bayonet joint is easily actuated and nevertheless ensures secure closure of the opening. Alternatively, the cover could also be fastened to the housing by a screw-type joint. It is also conceivable for the cover to be pivotally mounted on the housing, and to be detachably locked to the housing, on the side opposite the pivot axis, by latching, screw connection, clamping or tensioning.

Furthermore, it is preferably provided that a printed circuit board that carries the transponder is arranged in or one the housing. The printed circuit board also enables the transponder to be electrically contacted, and in particular the electrical contact from the transponder to the energy storage device can also be established, and preferably is established, via the printed circuit board.

Preferably, the printed circuit board is arranged so as to close the chamber on the side opposite the opening, in particular with the interposition of at least one sealing element. It is preferably provided that an annular sealing element, for example an O-ring or O-web, which is realized, in particular, so as to be elastically deformable, is arranged between the chamber and the printed circuit board. The sealing element in this case may be realized so as to be integral with the housing or with the printed circuit board, or it may be a separate component. It is thereby ensured that the interior of the chamber in which the energy storage device and, in particular, also the transponder are arranged are reliably protected against external influences. Prior to assembly, the chamber is thus open on two side, on the one hand through the opening, and on the other hand through the recess that is to be closed by the printed circuit board. As a result, the housing can be produced in a simple and inexpensive manner, and the identification module is easily fitted.

According to a preferred development of the disclosure, it is provided that the printed circuit board is clipped into the housing. The printed circuit board is thus fastened to/in the housing by latching, the holding force being provided, in particular, by the elastically deformable sealing element. The housing thus has latching tabs that preferably project laterally into the recess and that can be pressed back by the insertion of the printed circuit board. As soon as the latching tabs have been overcome by the printed circuit board, owing to their inherent elasticity they go back into their initial position, in which they engage behind the printed circuit board. The sealing element, which in this case is already compressed, then presses the printed circuit board back against the latching projections, such that the printed circuit board is held in a locked manner, in particular without play, between the latching projections and the sealing element. Preferably, a plurality of latching elements are arranged in a uniformly distributed manner over the circumference of the recess, in order to ensure secure locking of the printed circuit board.

It is additionally preferably provided that the back side of the printed circuit board that faces away from the chamber is sealed to the housing by means of an encapsulation compound. The encapsulation compound seals the back side of the printed circuit board to the housing, such that the chamber is reliably protected against external influences. The in particular provided sealing element in this case ensures that the encapsulation compound cannot penetrate into the chamber. The encapsulation compound is composed, in particular, of electrically non-conductive material, such that it also securely seals electrical contacts provided on the back side of the printed circuit board and separates, or insulates, them from one another and from the environment.

It is furthermore preferably provided that the housing has at least one alignment projection, which acts in combination with an alignment recess of the printed circuit board for the purpose of positively arranging/aligning the printed circuit board in/on the housing. Owing to the positive arrangement/alignment, it is ensured that the printed circuit board can be inserted in the housing in one way only. To that extent, a so-called poka-yoke connection is provided, which reliably prevents the printed circuit board from being incorrectly fitted in/on the housing. Preferably, the alignment projection is realized as a rib or web that extends, in the direction of insertion of the printed circuit board, in the direction of the chamber and when correctly fitted lies in the alignment recess of the printed circuit board. Alternatively or additionally, the alignment projection may be realized on the printed circuit board, and the alignment recess in the housing.

According to a preferred development of the disclosure, it is provided that the energy storage device is spring-loaded for the purpose of electrical touch contacting. The spring loading ensures reliable contacting of the energy storage device, including, for example, during operation of a hand-held power tool on which the identification module is arranged. The spring force in this case is preferably provided by an electrical contact element itself, in particular a contact spring, which is held on the printed circuit board and/or on the housing. Alternatively, it may also be provided that a spring element, for example a helical spring, can be arranged, or is arranged, between the cover and the energy storage device, in order, when the cover is closed, to press the energy storage device against the printed circuit board and against contact connections provided there.

Furthermore, it is preferably provided that the housing, on the outside, has at least one fastening lug for fastening an adapter plate and/or for fastening to a mobile device. An additional adapter plate may be arranged on the fastening lug or lugs, for example by means of snap connectors arranged on the adapter plate. The adapter plate, for example, enables the identification module to be arranged in differing mobile items, in particular hand-held power tools. Preferably, the printed circuit board has at least one fixing for external cables/cable connections. The fixing may be realized, for example, as a clip or as a hinge. As an alternative or in addition to the fastening lugs, the housing may have an adhesive surface, on which the housing can be adhesive-bonded to the mobile item. It is also conceivable to stick the housing to the adapter plate.

Particularly preferably, it is provided that the identification module has a theft warning device. The theft warning device serves, in particular, to inform the user if the identification module has been removed from the item. The theft warning device in this case may have a switch that can be actuated mechanically, which is actuated upon fitting of the identification module and is kept actuated as a result of the fitting. If the housing is removed from the item, the actuation of the switch ceases, and the transponder emits a warning signal, for example automatically. Alternatively, it may be provided that an electrical connection of the identification module is arranged, for example, outside the housing, in particular in the encapsulation compound, such that it is destroyed if the identification module is removed from the mobile item. The broken electrical contact then triggers a warning signal, which is emitted, for example, by the transponder.

BRIEF DESCRIPTION OF THE DRAWINGS

The disclosure is to be explained in greater detail in the following, on the basis of the drawings. For this purpose, there are shown FIG. 1 an identification module for a hand-held power tool, in a perspective top view, FIG. 2 the identification module, in a sectional representation, FIG. 3 a cover of the identification module, FIG. 4 a first bottom view of the identification module, in a pre-mounting state, and FIG. 5 a second bottom view of the identification module, in a further pre-mounting state.

Figure 1:
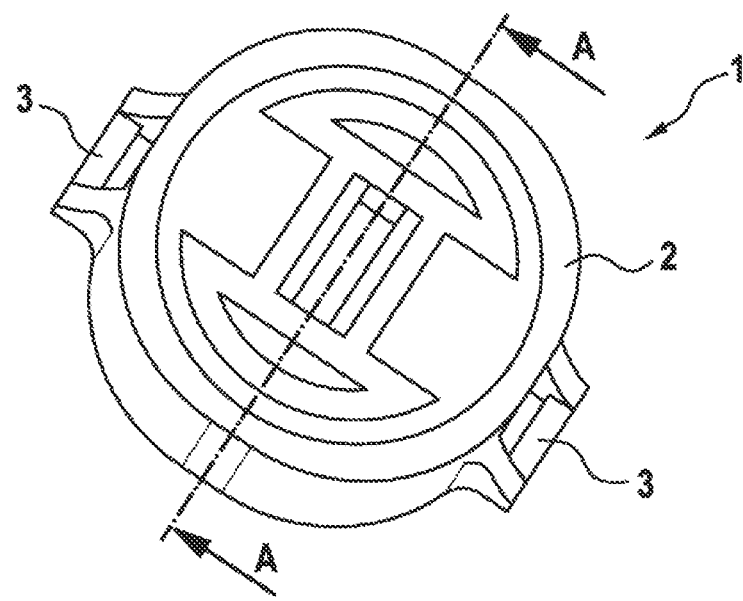
FIG. 1, in a perspective top view, shows an identification module 1 for a mobile item, in particular for a hand-held power tool. The identification module 1 has a housing 2, arranged or realized on which, on mutually diametrically opposite sides, there are fastening lugs 3 for fastening the identification module 1 to the hand-held power tool/item, or for fastening an adapter plate to the identification module 1.

The housing 2 has a chamber 4, in which a transponder 5, an energy storage device 6 and a printed circuit board 7 are arranged. The chamber 4 in this case is realized so as to be initially open on two opposing end faces of the housing 2. The printed circuit board 7 is inserted, from the underside 8 of the housing 2, into a recess 31 to the chamber 4 of the housing 2. The housing 2 in this case, on the inside of the chamber, has an annular projection 9 that projects into the chamber 4, against which the printed circuit board 7 bears with the interposition of an elastically deformable, annular sealing element 10. The chamber 4 is thereby ultimately closed, on the underside of the housing 2, by the printed circuit board 7 itself. The transponder 5 is arranged on the side of the printed circuit board 7 that faces toward the chamber 4.

The transponder 5 has a radio module 11 that is designed to transmit and receive data, and has a data storage 12 in which identification data can be stored. Also on the printed circuit board 7 are electrical contacts 13, for effecting touch contacting of the energy storage device 6, which in the present case is realized as a button cell.

The opening 15 of the chamber 4 that is assigned to the top side 14 of the housing is closed by a cover 16.

Figure 3:
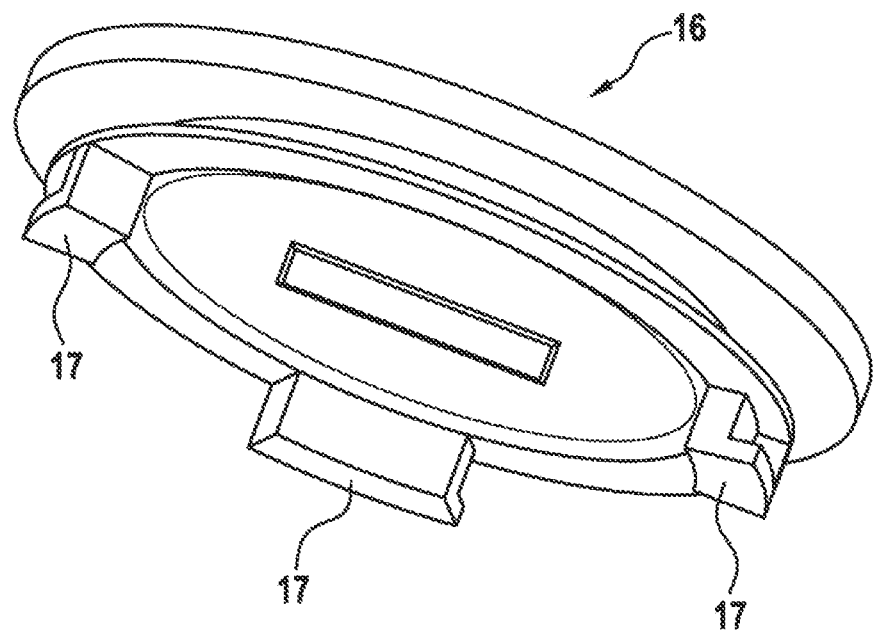

FIG. 3 shows the cover 16 in a perspective representation. The cover 16 has a circular contour, and on one side is provided with engagement elements 17, which acts in combination with therewith corresponding engagement counter-elements 18 of the housing 2 when the cover 16 is inserted in the opening 15 and rotated, such that the engagement elements 17 come into engagement with the engagement counter-elements 18. The cover 16, together with the housing 2 thus forms a bayonet joint 19, which allows the cover to be easily fastened to and detached from the housing 2. Preferably, the engagement elements 17 and/or the engagement counter-elements 18 each have a bevel, which has the effect that, when the cover 16 is rotated into the closed position, a force is generated that presses the cover 16 in the direction of the chamber 4. The underside of the cover 16, or the side of the cover 16 that is assigned to the chamber 4, in this case is configured in such a manner that it has at least one projection 20 that comes into bearing contact with the energy storage device 6, and presses the energy storage device 6 in the direction of the printed circuit board 7, such that a reliable electrical connection is permanently ensured between the energy storage device 6 and the printed circuit board 7, or the contact elements 13. The bevels achieve the effect that the energy storage device 6 is held, preloaded against the printed circuit board 7, in the chamber 4. The energy storage device to that extent is arranged, spring-loaded by the cover 16, in the chamber, for the purpose of touch contacting. Alternatively or additionally, a spring element is held preloaded between the cover 16 and the energy storage device 6.

On the side that faces away from the chamber 4, the cover 16 has a slot-shaped recess 21, into which a tool, for example a screwdriver or a coin, can be inserted in order to rotate the cover for the purpose of undoing or closing the bayonet joint. On its radial outer shell wall, the cover 16 additionally has a depression 22, arranged in which there is a sealing ring, in particular an O-ring 23 that, in the mounted state, is arranged in a sealing manner, preloaded radially between the cover 16 and the inner side of the housing 2.

Figure 4:
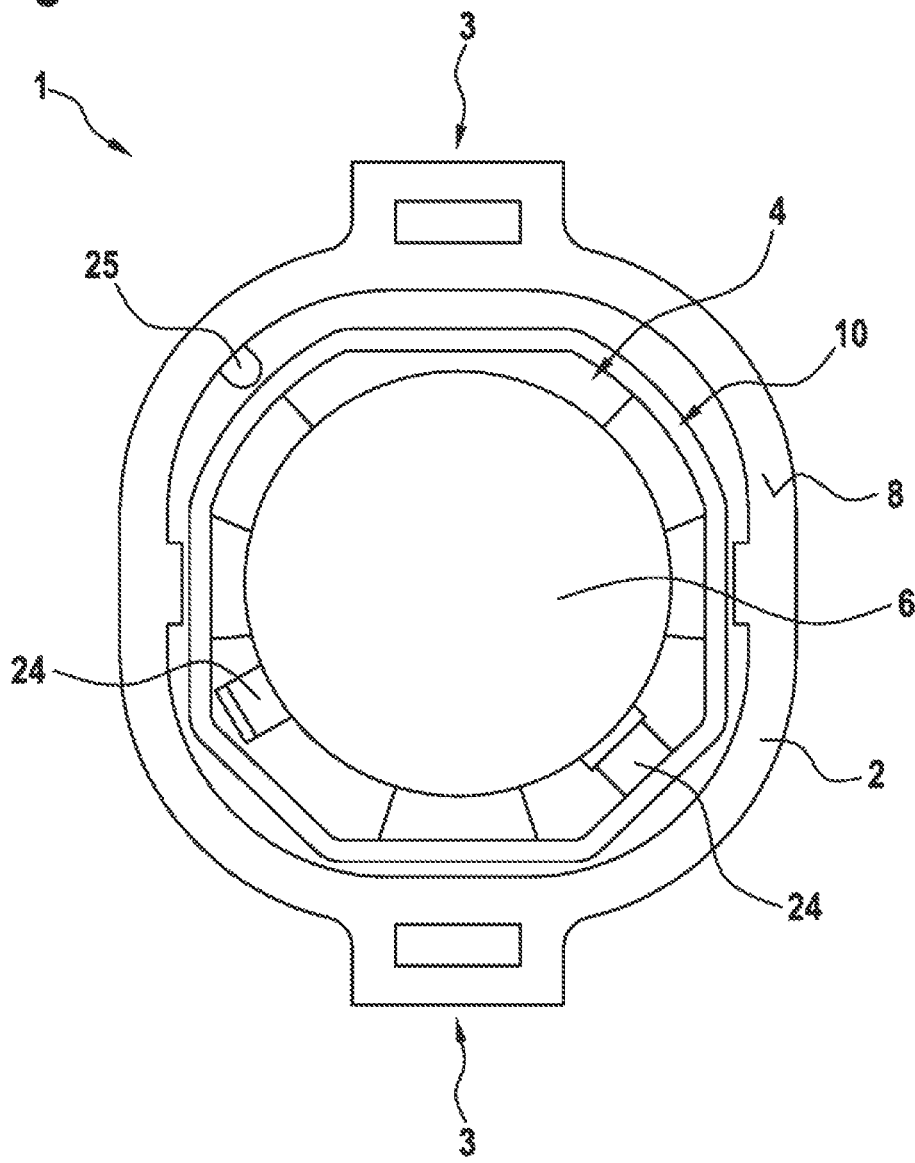

FIG. 4 shows a top view of the underside 8 of the identification module 1. Only the annular sealing element 10 and the underside of the energy storage device 6 can be seen in this case. In the mounting state represented in FIG. 4, the printed circuit board 7 is not yet installed/mounted with the transponder 5 arranged thereon. Slots 24, for receiving spring elements, not represented here, are realized in the housing 2, the spring elements serving, in particular, to hold, and if necessary preload and electrically contact, the energy storage device 6.

It can additionally be seen that the housing 2 has an alignment projection 25, which projects into the chamber 4 and which, in particular, is realized as an alignment web.

Figure 5:
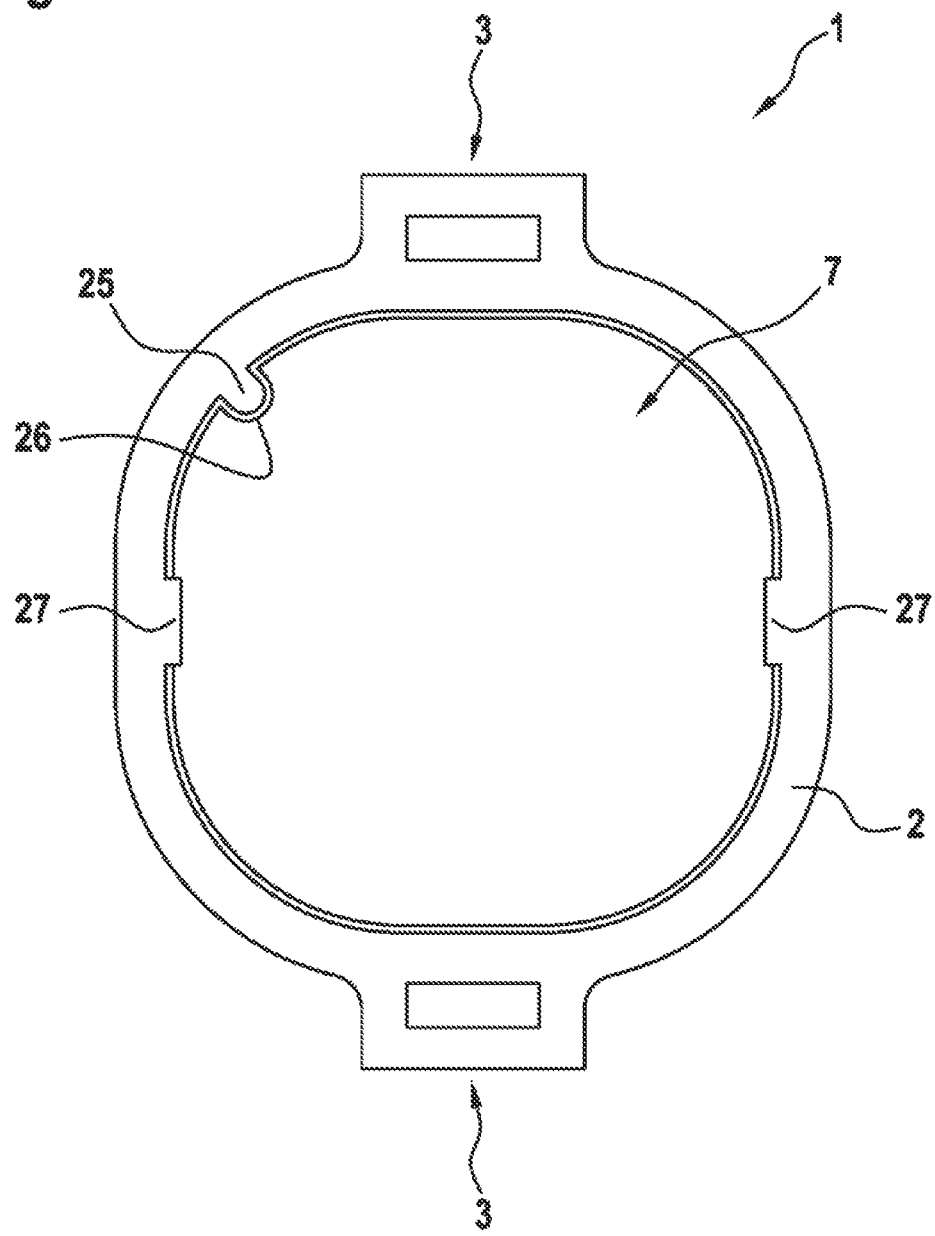

FIG. 5 shows a further top view of the underside 8 of the identification module 1, wherein, in this mounting state, the printed circuit board 7 is already inserted in the recess 31 of the housing 2. The printed circuit board 7 in this case has an alignment recess 26, realized to correspond to the alignment projection 25, such that the printed circuit board 7 can be inserted in the chamber 4 in one way only. The alignment projection 25 and the alignment recess 26 thus effect a poka-yoke connection, between the printed circuit board 7 and the housing 2, that ensures correct insertion of the printed circuit board 7, since incorrect mounting is not possible.

The housing 2 additionally has two latching projections 27, arranged oppositely in the chamber 4, which are realized so as to be elastically deformable. The latching projections 27 in this case are arranged in such a manner that the printed circuit board 7, upon being inserted in the chamber 4, is clipped-in, such that the latching projections 27 are initially elastically deformed and, after the printed circuit board 7 has passed the latching projections 27, spring back into their initial state because of their inherent elasticity, and thereby engage behind the printed circuit board 7 in a form-fitting manner. The printed circuit board 7 is thus held in a form-fitting manner in the housing 7, closing the recess 31.

Figure 2:
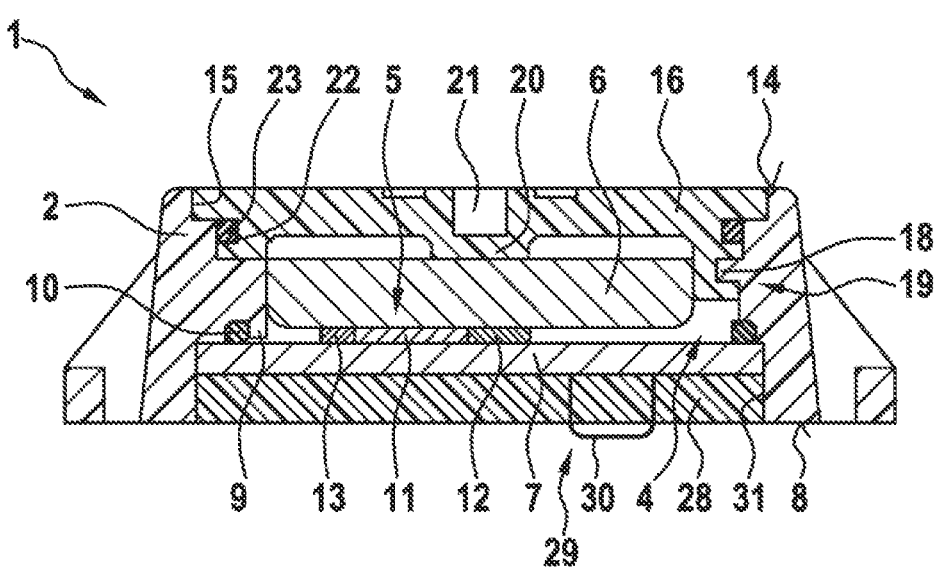
FIG. 2 shows a sectional representation through the identification module 1 from FIG. 1, along the line A-A in FIG. 1.

As can be seen from FIG. 2, in the final mounting step the back side of the printed circuit board 7 in the housing 2 is provided with an electrically insulating encapsulation compound 28, such that the printed circuit board 7 is sealed to the housing 2. The encapsulation compound is preferably composed of silicone, and is free of metal particles. The sealing element 10 prevents encapsulation compound from getting into the inside of the chamber 4. The encapsulation compound 28 effects final sealing of the chamber 4 and provides reliable protection, also for the back side of the printed circuit board and any electrical conductors present there.

When in operation, the identification module 1 can provide upon request, by means of the radio module 11, the identification data stored in the data storage 12. Preferably for this purpose there is a control unit/computing unit assigned to the radio module, or realized such that it is integrated into the radio module 11.

It is furthermore preferably provided that a surface coating is applied, in the manner of a soft component, to the outer faces and cover 16 of the housing 2, in order to protect the identification module against scratches. The soft component may also be used for impact damping. This is advantageous, in particular, if the cover 16 is flush with the housing 2. Alternatively, the cover 16 may be recessed into the housing 2, in which case it is possible to dispense with a soft component on the cover 16.

The housing 2 in the present case is of a rectangular basic shape, with rounded corners. Alternatively, however, the housing 2 may be oval or circular. It is also conceivable for the underside 8 of the housing 2 to have a concave or convex surface, to enable the identification module 1 also to be attached, in particular adhesive-bonded, to curved faces. The outer faces of the housing 2 are preferably beveled, such that, in the case of force acting laterally upon the housing 2, only small shearing forces are produced, in particular at the adhesive joint between the identification module 1 and the item to be identified, because the tool applying the acting force, for example a hammer, slips against the beveled surfaces. The fastening lugs 3 may also be used to fasten the identification module to items by means of cable binders, such that it is possible to dispense with adhesive bonding, and mounting of the identification module on the respective item can be effected more rapidly. This also enables the identification module 1 to be attached, for example, to one or more cables, for example to a cable harness.

Alternatively, as already mentioned previously, an additional adapter plate may be fastened to the fastening lugs 3, for example by means of a snap connection, the adapter plate advantageously being realized to be applied to a given item. Thus, for example, the adapter plate has a clip or a harness for fixing to mains power supply leads. As an alternative to the provision of the fastening lugs 3, it may also provided that the adapter plate is fastened to a circumferential collar of the housing 2. Alternatively or additionally, the housing 2 may also be adhesive-bonded to the adapter plate.

Advantageously, the identification module 1 is additionally provided with a theft warning device 29, which identifies removal of the identification module 1 from the item. For this purpose, the theft warning derive 29 has, for example, a flexible printed conductor 30 that is torn or destroyed if the identification module 1 is removed from the item, such that an electric circuit formed by the printed conductor is broken. This may also be detected by a suitable software or circuit, and signaled accordingly. Instead of a flexible printed conductor, a wire loop may also be provided. It is also conceivable to arrange a pushbutton or switch on the housing 2 in such a manner that it is actuated when the identification module 1 is applied to the item. If the identification module 1 is removed, the switch or pushbutton returns to its initial position. This, likewise, may be detected and signaled by a software or a corresponding circuit. Theft of the identification module can thus be signaled to a user, for example by the emission of a warning message, by means of the radio module 12, to a mobile telephone of the user.

Preferably, the identification module 1 additionally has an interface, not represented here, for wired or wireless communication with, for example, an electric hand-held tool. It is also conceivable for the identification module 1 to be realized to communicate wirelessly with other identification modules, in particular such that are present within the range of the radio module 12.

The identification module 1 preferably has another energy storage device, in particular a battery or accumulator, possibly having a different capacity, which is arranged in the chamber 4 and which ensures that, when the energy storage device 6 is changed, there is no interruption of current, and the identification module 1 can continue to be operated without interruption.

The invention claimed is:

1. An identification module for mobile items comprising:
   a housing including a mechanism configured to arrange or fasten the identification module onto a mobile device and a cover, the housing defining a chamber having an opening at a first side of the chamber, the cover configured to close the opening so as to close the first side of the chamber;
   a transponder including:
      a data storage device configured to store identification data; and
      a radio module configured to wirelessly transmit the identification data;
   an energy storage device configured to supply energy to the transponder, the energy storage device positioned in the chamber so as to be removable through the opening;
   a printed circuit board that is positioned in or on the housing, and that either (i) supports the transponder, or (ii) is connected to the transponder, the printed circuit board closing a second side of the chamber that is opposite the opening and the first side;
   at least one sealing element sealing the printed circuit board against the housing so as to seal the second side of the chamber; and
   an encapsulation compound sealing a back side of the printed circuit board, which faces away from the chamber, against the housing.

2. The identification module as claimed in claim 1, wherein the cover is or is configured to be detachably fastened to the housing by a bayonet joint in order to close the opening.

3. The identification module as claimed in claim 2, wherein the cover includes an engagement element configured to engage an engagement counter-element of the housing so as to form the bayonet joint.

4. The identification module as claimed in claim 3, wherein the engagement element is a projection on the cover and the engagement counter-element is a recess defined in the housing, and each of the engagement element and the engagement counter-element is beveled such that, when the cover is in a closed position, the bayonet joint causes the cover to exert a force in the direction of the chamber.

5. The identification module as claimed in claim 1, wherein the printed circuit board is clipped into the housing.

6. The identification module as claimed in claim 1, wherein the housing further includes at least one alignment projection configured to cooperate with at least one of the printed circuit board, an alignment recess of the printed circuit board, or an alignment projection of the printed circuit board in order to positively align the printed circuit board with the housing.

7. The identification module as claimed in claim 1, wherein the energy storage device is arranged in the chamber via spring-loading so as to form an electrical touch contact.

8. The identification module as claimed in claim 1, wherein the mechanism configured to arrange or fasten the identification module onto a mobile device includes at least one fastening lug located on an outside of the housing, and configured to fasten to at least one of an adapter plate and the mobile device.

9. The identification module as claimed in claim 1, further comprising a theft warning device.

10. The identification module as claimed in claim 9, wherein the theft warning device includes a flexible printed conductor connected to the printed circuit board and extending through the encapsulation compound to an exterior side of the encapsulation compound.

11. The identification module as claimed in claim 1, wherein the encapsulation compound encapsulates the entirety of the back side of the printed circuit board.

* * * * *